SMITH & GALLAHER.
Fire Place.
No. 12,491.
Patented March 6, 1855.
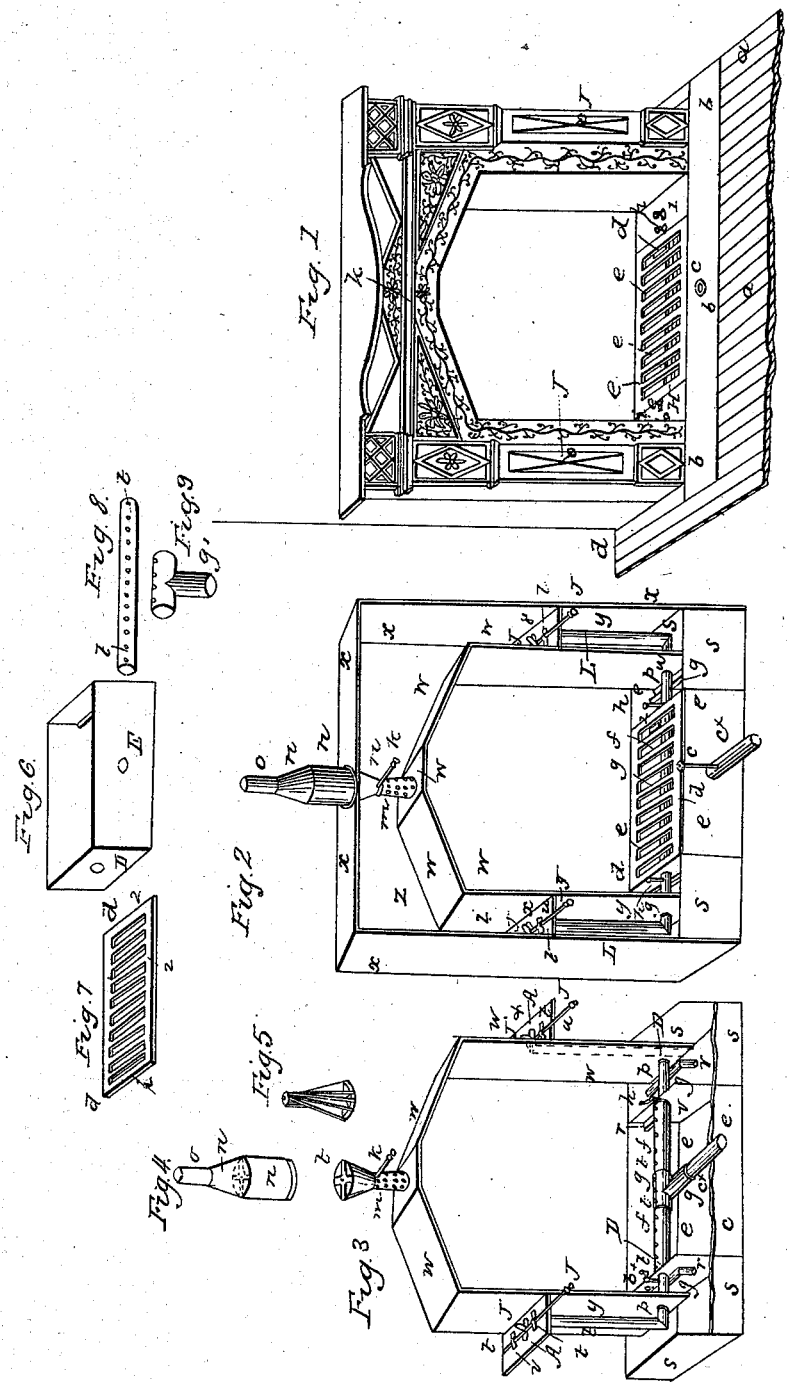

UNITED STATES PATENT OFFICE.

JOHN W. SMITH AND JOHN S. GALLAHER, JR., OF WASHINGTON, DISTRICT OF COLUMBIA.

FIREPLACE.

Specification of Letters Patent No. 12,491, dated March 6, 1855.

*To all whom it may concern:*

Be it known that we, JOHN W. SMITH and JOHN S. GALLAHER, Jr., citizens of Washington, in the District of Columbia, have invented and made certain new and useful Improvements in the Mode of Constructing Fireplaces; and we do hereby declare that the following is a full, clear, and exact description of the method of construction of the said improvements, together with the operation thereof, reference being had to the accompanying drawings, making a part of this specification, in which—

Figure 1, shows a view of the improved fire place, and a mantle arranged complete in combination $a, a, a, a,$ showing a portion of the floor, and $b, b, b$ the hearth stone or front; $c$, the damper or draft cut off; $d, d, d,$ the grate, resting on the edges, or top of the ash or cinder box $e, e, e.$  $f, f,$ is the perforated blower pipe; $g,$ the collar to pipe; $h, h,$ the end valves, or smoke cut offs; $i, i,$ handles to the lids of water chests; $j, j,$ knobs to valves of smoke conduits; $k,$ the knob to valve or draft cut off.

Fig. 2, shows the whole apparatus exposed to view; $c,$ the damper, to the draft tube $c^*$; $d, d, d,$ the grate; $e, e, e, e,$ the ash of cinder box; $f f,$ the perforated blower pipe; $g,$ the detachable collar to the blower pipe; $h, h,$ the end valves, or smoke cut offs; $j, j,$ the knobs, to valves $j^*, j^*,$ of smoke conduits L, L; K, the knob to valve or draft cut off, arranged at junction of throat $m$ and neck $n, n,$ attached to the flue O; P, P, the elbows to the smoke conduits L, L, communicating with the ends of the perforated blower pipe $f, f;$ $g, g, g,$ lateral conduit arms, with short elbows turned downward, and within the water chests S, S; $t, t,$ boxes for the valve rods $u, u;$ $v, v,$ rests or pillows of the perforated blower pipe $f, f;$ $w, w, w, w, w, w,$ top and sides of the fire place; $x, x, x, x, x, x,$ the outside casing surrounding the apparatus; $y, y,$ vapor chambers; $z, z, z,$ smoke reservoirs; &, &, diaphragms.

Fig. 3, shows the apparatus more in detail, and sectional parts. C*, is the air or current tube, connected to the perforated blower pipe, by an extension shoulder $g^*$; $e, e, e, f, g, h, i, j, k,$ L, $m, n,$ P, $q,$ references of similar parts in Fig. 2; $r, r, r,$ deflecting elbows; $s, s, t, t, u, u, v, w, y,$ similar references to Fig. 2; &, &, also similar references; A, A, hot-air outlets; B, B, indicate the mouths of the smoke conduits L, L; * * shifting handles to the perforated blower pipe; †, †, †, †, air holes of pipe; ‡ step of draft wheel.

Fig. 4, neck and flue; the dots show wheel; Fig. 5, the draft wheel; Fig. 6, ash, or cinder box, showing the end and front passage holes D, E, connecting or communicating with the air tube C*, and the perforated blower pipe $f, f,$ and conduit L. Fig. 7, is the grate. Fig. 8, shows the perforated blower pipe, detached, with open ends, and air escapes, or holes †, †, †, †, †, †. Fig. 9 is the detachable collar and shoulder $g^*$.

To enable others skilled in the art, to make and use our improvements, which we term the economical fire place, we will herewith give a description of the same, the object of which is to economize the carbonaceous and smoky matter afforded by the imperfect combustion of fuel, and to make the same useful, by converting the properties thereof into an inflammable and illuminating material, together with rendering available, by aid of the same apparatus, the perfect ventilation and curing of defective chimney flues and fire drafts.

Our improvements, consist in the forming within any chimney stack, or shaft, a recess or suitable space, within which can be formed a chamber, or fitted a casing of metal of proper shape, with top, back, and sides, as shown at $x, x, x, x,$ Fig. 2, within which is formed, or fitted a fire place of any required design similar to $w, w, w, w,$ with sloping, or concave top, and having a double funnel neck, throat, and flue, $m, n, n, o,$ and combined therewith in use is a draft wheel, Fig. 5, used to induce with more certainty, a strong, quick, current of air from the air pipe or tube C*, and also to counteract by its rotary motion, the downward pressure of a dense atmosphere or driving wind, which generally tend to cause the smoking of chimneys.

The current or draft from the air pipe $C^x$, does not enter the fire in one volume, but instead thereof it enters the blower pipe $f, f,$ Figs. 2, 3, and 8, and is divided or converted into small jets or currents, by escaping through the vents or perforations $t, t, t, t,$ and coming in contact with the coals, or flames of the fire, and converted into hot air drafts or diffused currents. Thus, the more readily inducing when required, perfect combustion, and complete ventilation, by affording or supplying the required amount of oxygen, throughout the whole volume of fire. Thus it is, that this apparatus is a certain remedy against the smoking of defective chimney flues, or fire draft. The main volume of cold air may be supplied to the perforated blower pipe, by any of the well known methods of pipes, or tubes carried beneath the floor, or in any other well known mode, none of which however do we claim.

The back of this fire place, $w$, $w$, $w$, $w$, fits flush up to the back of the recess $x$, $x$, $x$; but there is a suitable space between, the tops, and sides of the casing and fire place, as at $y$, $y$, $z$, $z$. Within the bottom part of the recess or casing $x$, $x$, $x$, $x$, is fitted a detachable ash or cinder box $e$, $e$, $e$, $e$, half the length of the whole recess. The top, not projecting above the level of the hearth stone or front of fire place. This box is set in the middle, of the fire place, and at each end thereof, and flush thereagainst, is arranged a distinct box, or water chest S, S, S, S. Thus the whole space from side to side of the recess, is filled up, by the boxes S, S, S, S and ash pan or box $e$, $e$, $e$, $e$. Through the ends of the ash box or pan, and the ends of the water chests S, S, S, S, opposite to each other are holes, or communications D, D, Fig. 3, into which are arranged or fitted closely, the ends of the elbows P, P, of the conduit pipes L, L. Within the ash pan $e$, $e$, $e$, $e$, is arranged longitudinally, a blower pipe, with perforations or air vents $t$, $t$, $t$, $t$, at regular intervals. Around the middle of the pipe, which is made adjustable, is a movable perforated collar $g$, with an opening through the shoulder or arm $g^x$ opposite to a corresponding one in the pipe Fig. 8. The ends of this pipe are supported by rests $v$, $v$, Fig. 3, attached to the inside of the ends of the ash box. Through the front of this box $e$, $e$, $e$, $e$, is a suitable sized hole of about one or two inches into which is fitted, the shoulder of collar arm $g^x$, Figs. 3 and 9. This shoulder or arm, extends through, and fits into an air pipe or draft tube $c^x$. This tube has a revolving valve or cut off, with rod running upward, having a head or cap $c$, fitting into a counter sink, formed in the hearth stone, as at $b$, $c$, Fig. 1. Attached to the outside of the fire place, about midway more or less, are diaphragms, partitions or shelves &, &, which divide the spaces $y$ $z$, $y$, Fig. 2. Thus forming hot air or vapor chambers, and reserviors or gas receivers. These shelves or partitions each have two holes, A, A, B, B; into one each of which is fitted, vertically arranged smoke or conduit pipes, L, L, of from 1, to 2, inches diameter, passing down parallel, with the sides of the casing and fire place. To the lower part of the pipes L, L, are formed arms P P, which run horizontally, and communicate with the open ends of the blower pipe, by passing through the ends of the water chests S, S, S, S, S, S, S, S, and the ash pan or cinder box $e$, $e$, $e$, $e$. The arms of these pipes, each have one or more branches, or elbows, turned downward, with open ends, and dip into the water chests as at $q$ $r$, $q$ $r$, $q$ $r$, $q$ $r$, Fig. 3. The branches $r$, $r$, $r$, $r$, dip down into the water about half an inch, or only sufficiently deep to admit of as little pressure of the water as possible, in order to admit of the passing of the carbonaceous matter and smoke, through the volume of water in the chests S, S, S, S.

In order to obviate any undue accumulation of carbonaceous matter within the recesses or reservoirs $z$, $z$, $z$, $z$, provision is made therefor by using the valves or shut offs $h$, $h$, attached to the shifting or adjusting rods * * which valves, together with the valves J* J*, may be opened so as to afford the passage of the excess of matter immediately through the perforated blower pipe or tube, out, and into the coals, or flame of the fire, to be consumed, or passed off, up, through, and out of the neck, or flue of the chimney.

The ends, of the fire place sides $w$, $w$, $w$, $w$, may extend entirely down to the bottom of the water chests $s$, $s$, $s$, $s$, $s$, $s$, and in such case they must be perforated above the water line, or their ends may not touch the water, either of which, will admit of the purified gaseous matter, to enter and occupy the spaces, or receivers, $y$, $y$, Fig. 3. In the construction of our economical fire place, it can be so arranged, as to admit of converting the smoke reservoirs $z$, $z$, $z$, $z$, into gas receivers also.

The process of imperfect combustion which we avail ourselves of, to produce gas, is brought about by closing up the front of the fire place, by a fire board or an attachable shield plate, door, or equivalent. The shutting off, of the common atmosphere of the room, together with almost entirely cutting off, or at least greatly diminishing the draft of cold air, afforded by the air tube or pipe C*, together with turning down, or adjusting the blower pipe, and also shutting down the valve or damper $m$, Fig. 3, thus affording a limited amount of draft, and oxygen, imperfect combustion is the consequence, and the product thereof, instead of being permitted to escape, upward, out of the chimney and be lost, is diverted in its course, and passes out of the perforations in the throat of the fire place, and accumulates within the hot-air chambers, or reservoirs $z$, $z$, $z$, $z$, and thence passes down through the conduit pipes L, L, induced by the pressure, and accumulation of the carbonaceous gas, in the fire place. And thus this carbonaceous matter afforded by imperfect combustion is caused to be injected into, and through the water contained in the chests s, s, s, s, and water contained in the chests S, S, S, S, and assumes the nature of an inflammable matter. In the forming of this inflammable article, the valves J*, J*, Fig. 3, must be shut down over the holes A, A, and the whole apparatus containing the gas, must be airtight. The receivers, or the mantlepiece may be tapped, or communicated with by tubes, pipes, or the ordinary gas fittings, and distributed throughout any dwelling.

Having described the construction, nature and priciples of our improved economical fire place; what we claim as new, useful, and of our invention, and desire to secure by Letters Patent of the United States, is as follows, viz:

We claim the adjustable perforated blower pipe with perforated collar, as described; arranged with the detachable, fire place; the latter having a perforated throat and double funnel ventilator; together with the valves, diaphragms partitions, smoke conduit pipes, as constructed; and arranged with the recess casings, forming air chambers, and gas receiving apartments, substantially as described and shown, and for the purposes set forth.

JOHN W. SMITH. [L. S.]
JOHN S. GALLAHER, JUNIOR. [L. S.]

Witnesses:
SAML. GRUBB,
JOS. CLARK.